United States Patent [19]

Tamai

[11] Patent Number: 5,712,699
[45] Date of Patent: Jan. 27, 1998

[54] GUIDE DEVICE FOR PHOTOSENSITIVE MATERIAL

[75] Inventor: Masayuki Tamai, Wakayama, Japan

[73] Assignee: Noritsu Koki Co., Ltd., Wakayama, Japan

[21] Appl. No.: 527,426

[22] Filed: Sep. 13, 1995

[30] Foreign Application Priority Data

Sep. 13, 1994 [JP] Japan .................................. 6-218887

[51] Int. Cl.$^6$ ............................................. G03B 27/58
[52] U.S. Cl. ............................ 355/72; 355/28; 355/29; 226/196
[58] Field of Search ........................... 226/91, 89, 90, 226/189, 196; 355/72, 310, 29, 28

[56] References Cited

U.S. PATENT DOCUMENTS

| | | |
|---|---|---|
| 3,785,543 | 1/1974 | Lee .................................... 226/188 |
| 4,046,372 | 9/1977 | Ebner ................................. 271/273 |
| 4,348,125 | 9/1982 | Fujiwara et al. ................. 400/645.1 |
| 4,352,448 | 10/1982 | Hammer et al. ..................... 226/108 |
| 5,153,661 | 10/1992 | Shimizu et al. .................... 355/309 |
| 5,274,427 | 12/1993 | Miyasaka et al. .................. 355/310 |
| 5,504,555 | 4/1996 | Yamamoto ............................ 355/29 |

*Primary Examiner*—R. L. Moses
*Assistant Examiner*—Shival Virmoni
*Attorney, Agent, or Firm*—Wenderoth, Lind & Ponack

[57] ABSTRACT

A guide device is for use in a photoprinting machine to guide photosensitive materials and including a paper magazine housing a roll of photosensitive material, an exposure unit, and a feed path. The guide device has a paper guide provided along the feed path. The paper guide has a pair of guide plates provided opposite to and spaced from each other so that the photosensitive material can pass therebetween. One of the two guide plates is fixed while the other is supported so as to be movable between an open position and a closed position. If the material is jammed, it can be removed by opening the other guide plate.

5 Claims, 10 Drawing Sheets

GUIDE DEVICE FOR PHOTOSENSITIVE MATERIAL

BACKGROUND OF THE INVENTION

This invention relates to a guide device for use in a photoprinting machine for printing images on films onto a web of photosensitive material, to guide the photosensitive material.

A photoprinting machine has an exposure unit for printing negative images formed on negative films onto a photosensitive material which has been fed into the exposure unit from a paper magazine. The photosensitive material being fed toward the exposure unit is guided by a plurality of paper guides provided along its feed path.

Every time the print size is changed, it is necessary to change the photosensitive material for one with a different width. It is therefore necessary to use paper guides capable of guiding photosensitive materials of many different widths.

A conventional paper guide of this type is shown in FIGS. 11 and 12. It has a pair of side edge guides 70 having a U-shaped section for guiding the side edges of a photosensitive material P. The guides 70 are in threaded engagement with inversely threaded portions of a threaded shaft 71. By rotating the threaded shaft 71 by controlling a knob 73 provided at one end of the shaft 71, it is possible to adjust the distance between the guides 70. A plurality of such paper guides are provided over the entire length of the feed path for the sensitive material P.

If the photosensitive material is jammed between the paper guides, the threaded shafts 71 of all the paper guides have to be turned to move the side edge guides 70 of the respective paper guides away from each other in order to remove the jammed portion of the sensitive material P. After removing the jammed portion, the threaded shafts 71 have to be turned in the reverse direction to move the respective side edge guides 70 back to their original positions. Such operation is extremely troublesome and time-consuming.

An object of this invention is to provide a guide device for guiding photosensitive materials with which any jammed portion of a photosensitive material can be removed easily.

SUMMARY OF THE INVENTION

According to this invention, there is provided a guide device for use in a photoprinting machine to guide photosensitive materials, the photoprinting machine including a paper magazine housing a roll of photosensitive material, an exposure unit, and a feed path along which the photosensitive material is fed from the paper magazine to the exposure unit. The guide device includes a paper guide provided along the feed path, for guiding the photosensitive material. The paper guide has two guide plates provided opposite to and spaced from each other so that the photosensitive material can pass therebetween, one of the two guide plates being fixed while the other is supported so as to be movable between an open position and a closed position.

In order to protect the sensitive material against damage while being fed, one of the guide plates that faces an emulsion-coated side of the photosensitive material carries rotatable rollers adapted to rotate by being brought into contact with the photosensitive material.

In order to prevent extreme meandering of the sensitive material, one of the two guide plates of the paper guide is preferably provided with a pair of side plates.

Since the paper guide comprises a pair of guide plates, if a photosensitive material is jammed between the guide plates, the jammed portion can be easily removed by opening one of the guide plates and tearing the jammed portion.

Other features and objects of the present invention will become apparent from the following description made with reference to the accompanying drawings, in which:

DETAILED DESCRIPTION OF PREFERRED EMBODIMENTS

Embodiments of the invention are now described with reference to FIGS. 1–10.

Figure 1:
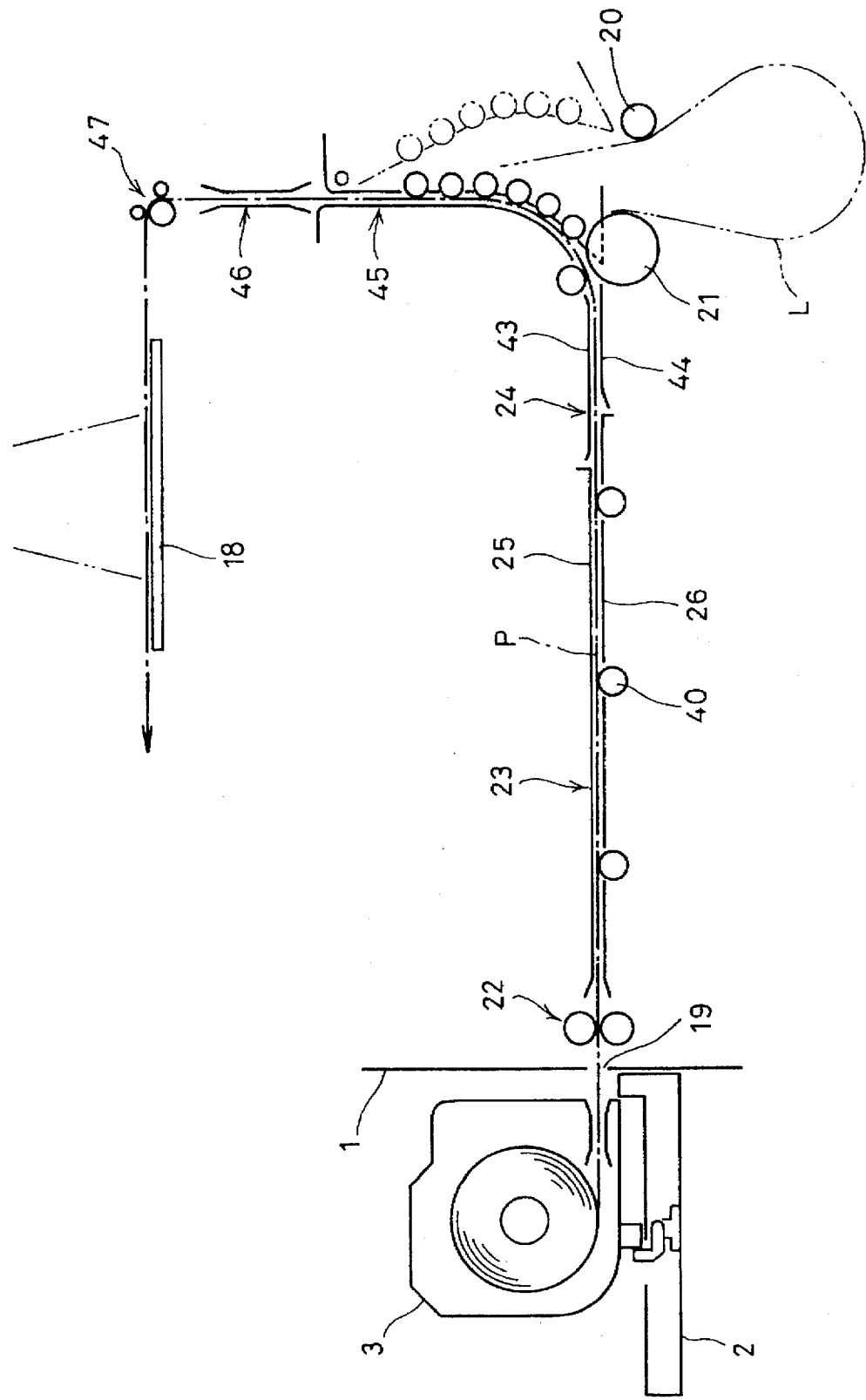
FIG. 1 is a schematic view of a photoprinting machine equipped with the guide device according to this invention.

First referring to FIG. 1, a photoprinting machine has an outer case 1, a magazine support table 2 provided outside the outer case 1, and a paper magazine 3 supported on the magazine support table 2.

Figure 2:
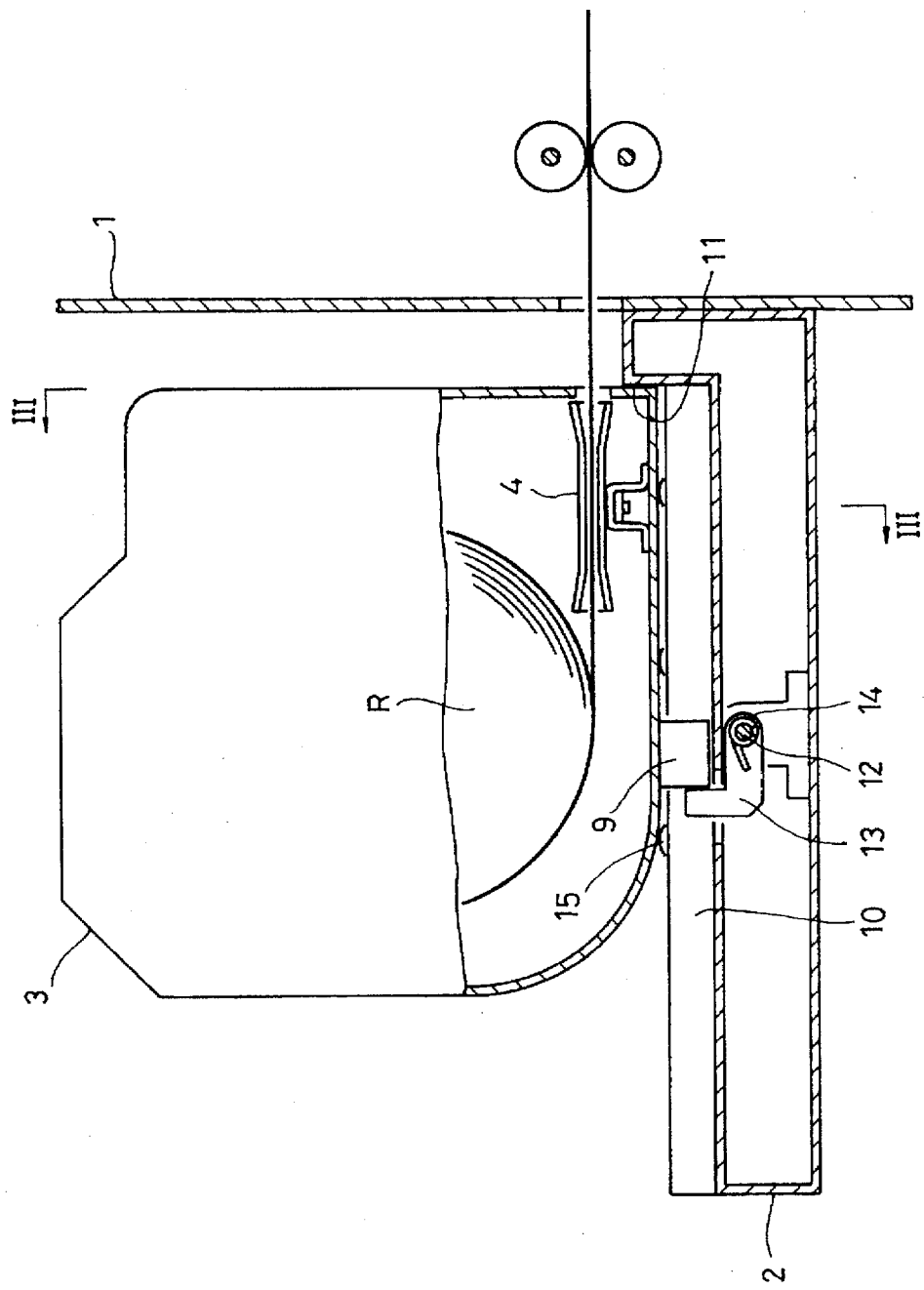
FIG. 2 is a partially cutaway front view of a paper magazine supporting portion.
Figure 3:
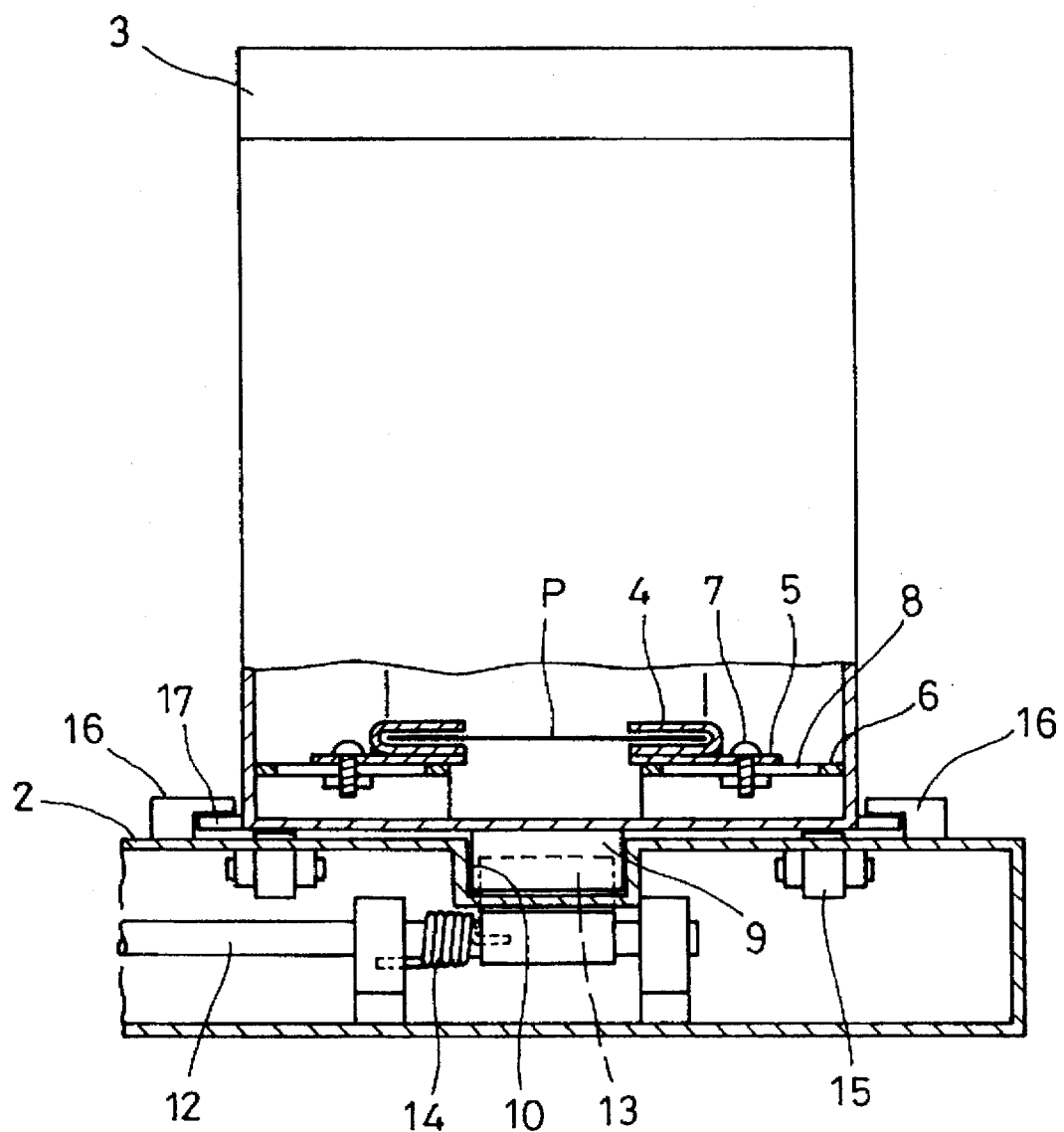
FIG. 3 is a sectional view taken along line III—III of FIG. 2.

As shown in FIGS. 2 and 3, the paper magazine 3 can replaceably accommodate a roll R of photosensitive material P. Mounted inside the paper magazine 3 are a pair of width restriction guides 4 for guiding the photosensitive material P being pulled out of the roll R.

Each width restriction guide 4 has a U-shaped section and is adapted to guide longitudinal edges of the photosensitive material P. The distance between the width restriction guides 4 is adjustable according to the width of the photosensitive material P housed in the paper magazine 3.

The width restriction guides 4 of this embodiment have mounting pieces 5 fixed to guide support plates 6 provided inside the paper magazine 3 by means of coupling means 7 comprising a screw and a nut. The screw of each coupling means is inserted in a transversely elongated hole 8 formed in each guide support plate 6. The paper magazine 3 has on its bottom surface a protrusion 9 adapted to be received in a guide groove 10 formed in the top surface of the magazine support table 2. The paper magazine 3 is placed on the magazine support plate 2 so that its protrusion 9 fits in the guide groove 10, and is pushed forward until it abuts a positioning piece 11 provided at the front end of the magazine support plate 2.

A locking cam 13 is fixedly mounted on a rotary shaft 12 extending under the guide groove 10. By rotating the rotary shaft 12, the tip of the locking cam 13 protrudes into the guide groove 10, engaging the back of the protrusion 9. A torsion coil spring 14 mounted around the rotary shaft 12 biases the locking cam 13 so as to press it against the paper magazine 3. Thus, the paper magazine 3 is positioned accurately by being pressed against the positioning piece 11 under the biasing force of the spring 14.

As shown in FIG. 3, rollers 15 are provided to guide the paper magazine 3 when it is inserted and pulled out. Guides 16 are provided to prevent the paper magazine 3 from shifting sideways by guiding guide pieces 17 attached to both sides of the paper magazine 3.

As shown in FIG. 1, an exposure table 18 is mounted in the outer case 1. The photosensitive material P pulled out of the paper magazine 3 is inserted through an inlet 19 formed in the outer case 1 and pulled onto the exposure table 18 for printing.

Front and rear guide rollers 20 and 21 are provided along the feed path of the photosensitive material P from the inlet 19 to the exposure table 18. Along the feed path between the inlet 19 and the rear guide roller 21 are provided, from upstream to downstream, a pair of feed rollers 22 for feeding photosensitive material P in the paper magazine 3 toward the rear guide rollers 21, a first long paper guide 23, and a second short paper guide 24.

Figure 4:
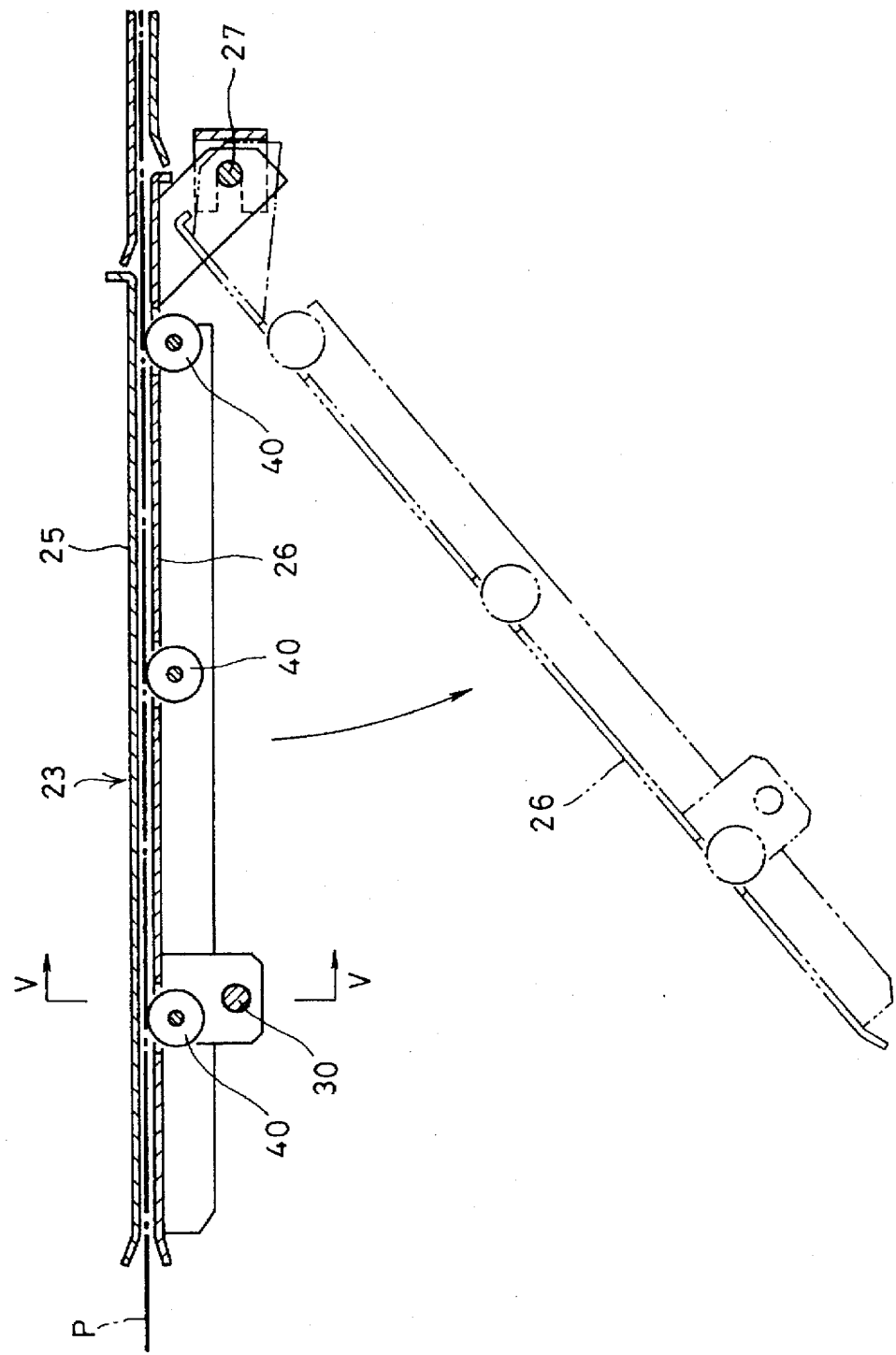
FIG. 4 is an enlarged sectional view of a first paper guide.
Figure 5A:
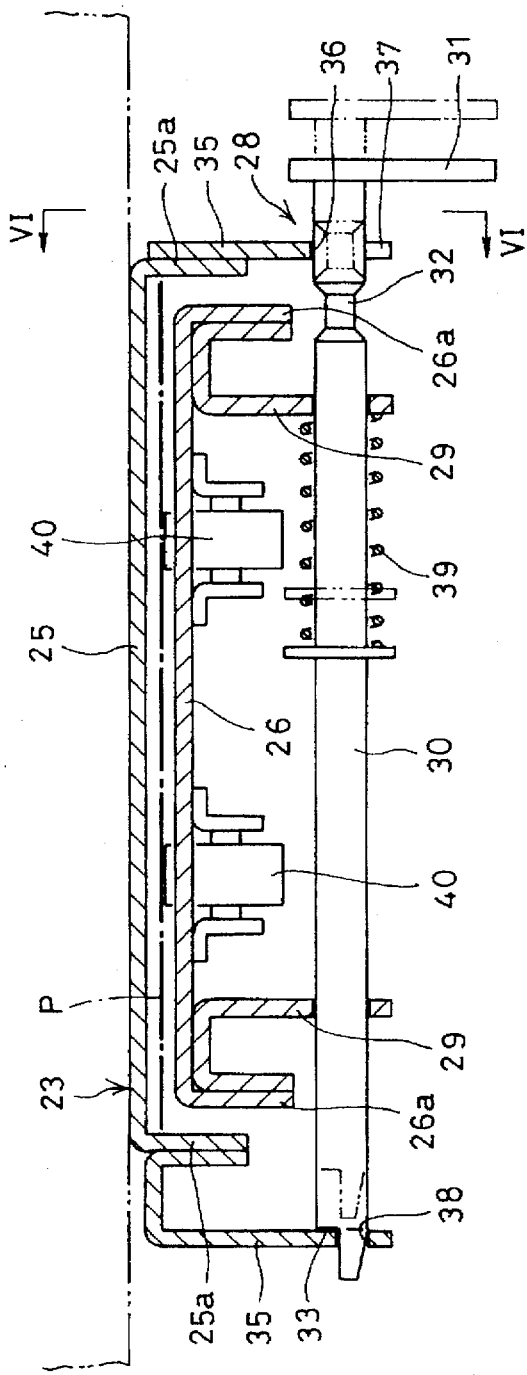
FIG. 5A is a sectional view taken along line V—V of FIG. 4.
Figure 5B:
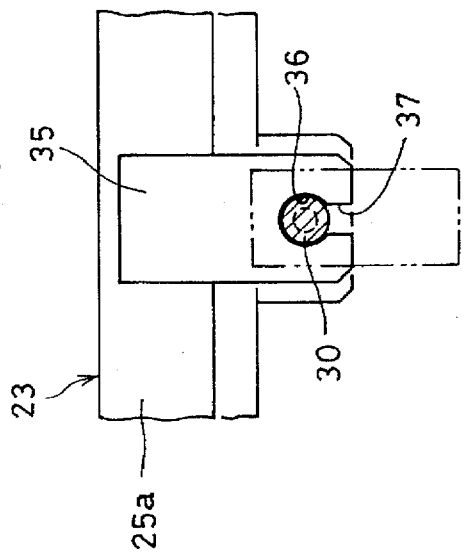
FIG. 5B is a sectional view taken along line VI—VI of FIG. 5A.

FIGS. 4-5B show the detailed structure of the first paper guide 23. It includes upper and lower guide plates 25, 26 spaced from each other so that the sensitive material P can pass therebetween. The upper plate 25 has downwardly extending side plates 25a on both sides (FIG. 5A). The upper guide plate 25 is fixed to a stationary member by screws or other coupling means.

The lower guide plate 26 has a downwardly extending side plates 26a on both sides thereof. It has its front end, with respect to the feed direction of the sensitive material P, pivotable about a shaft 27 between its closed and open positions (FIG. 4).

The lower guide plate 26 is maintained in its closed position, in close proximity to the upper guide plate 25, by a locking mechanism 28 (FIG. 5A).

The locking mechanism 28 comprises a pair of transversely apart shaft support pieces 29 fixed to the side plates 26a of the lower guide plate 26, a locking shaft 30 slidably supported by the shaft support pieces 29, and a lever 31 provided at one end of the locking shaft 30. The locking shaft 30 has a small-diameter portion 32 near the lever 31 and a shoulder portion 33 at its other end. Engaging plates 35 are coupled to the respective side plates 25a of the upper guide plate 25. One of the engaging plates 35 is formed with a hole 36 through which the locking shaft 30 extends and a cutout 37 continuous with the lower edge of the hole 36 and sized so as to allow passage of the small-diameter portion 32. The other engaging plate 35 has a hole 38 through which the locking shaft 30 extends.

With both ends of the locking shaft 30 extending through the engaging plates 35, the lower guide plate 26 is held in its closed position by the locking mechanism 28. In order to unlock the lower guide plate 26, the locking shaft 30 is moved against the biasing force of a spring 39 mounted around the shaft 30 by controlling the lever 31 until its other end is pulled out of the hole 38 and its small-diameter portion 32 is located opposite to the cutout 37, and then the small-diameter portion 32 is pushed into the cutout 37.

The sensitive material P in the paper magazine 3 is pulled out into between the upper guide plate 25 and the lower guide plate 26 with its emulsion-coated surface facing the lower guide plate 26, which is wider than the maximum width of the photosensitive material P. A plurality of rollers 40 are rotatably supported under the lower guide plate 26 so that their top ends protrude from the top surface of the lower guide plate 26 and guide the sensitive material P (FIG. 5A).

Figure 10:
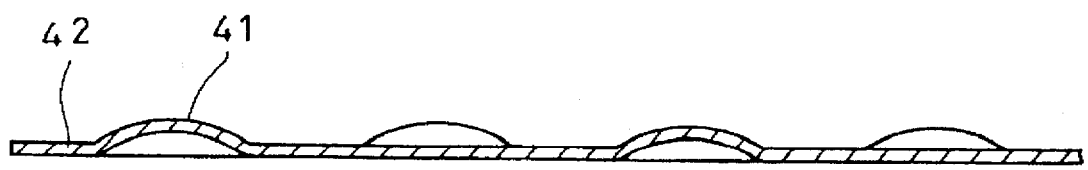
FIG. 10 is a sectional view of a guide plate of another type.

As shown in FIG. 10, the lower guide plate 26 and the upper guide plate 25 are plate members 42 having round protrusions 41 uniformly over the entire area thereof. The protrusions 41 serve to reduce contact resistance produced when the sensitive material P is fed between the guide plates and thus to keep the sensitive material P damage-free.

The second paper guide 24, provided downstream of the first paper guide 23, comprises upper and lower guide plates 43 and 44 which are spaced from each other so that the sensitive material can pass therebetween. Both guide plates 43 and 44 are fixed.

Along the feed path of the sensitive material P extending from the rear guide roller 21 provided at the outlet of the second paper guide 24 to the exposure table 18 are provided, from upstream to downstream, a third paper guide 45, width restriction guides 46 for guiding both longitudinal edges of the sensitive material P, and feed rollers 47 for feeding the sensitive material P toward the exposure table 18.

Figure 11:
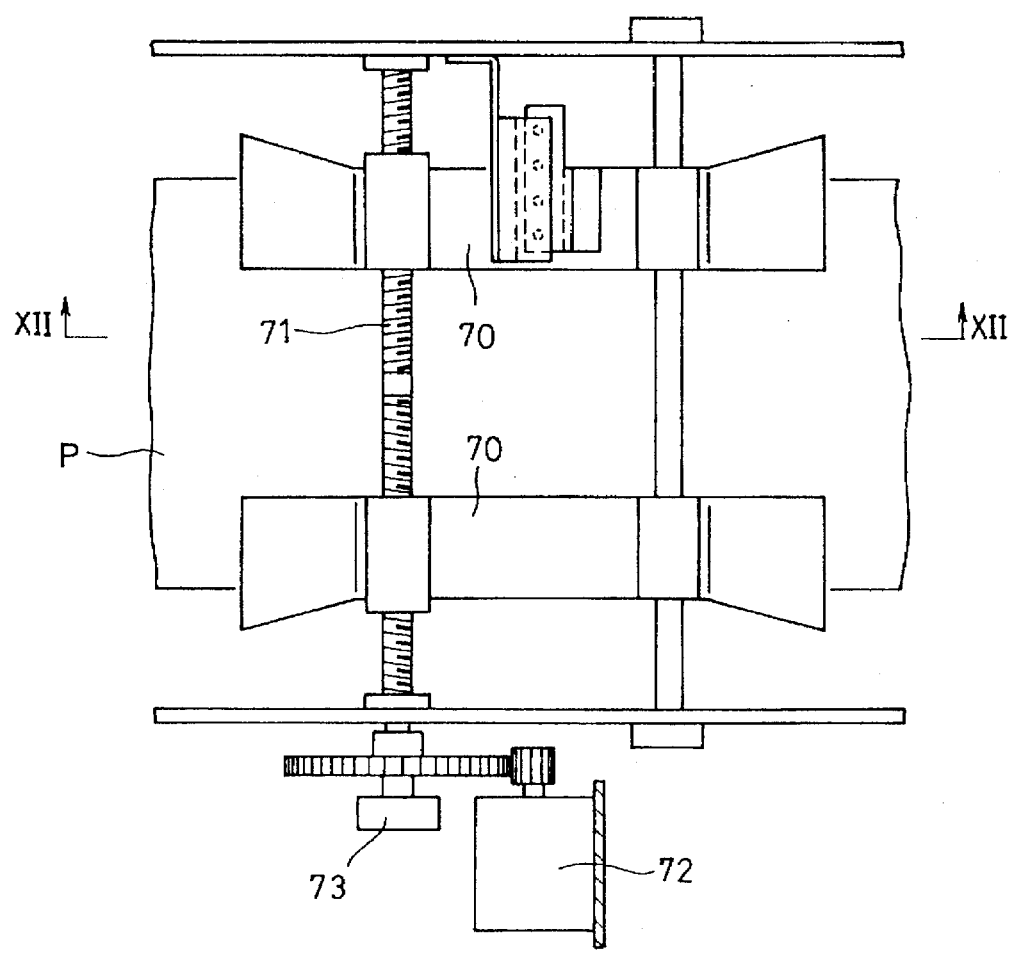
FIG. 11 is a plan view of a conventional paper guide.
Figure 12:
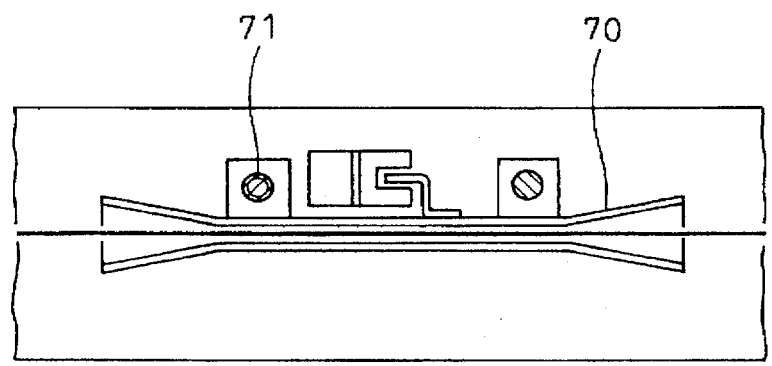
FIG. 12 is sectional view taken along line XII—XII of FIG. 11.

The width restriction guides 46 are of the same type described above with reference to FIGS. 11 and 12. Thus, their description is omitted here, while indicating like elements with like numerals.

Figure 6:
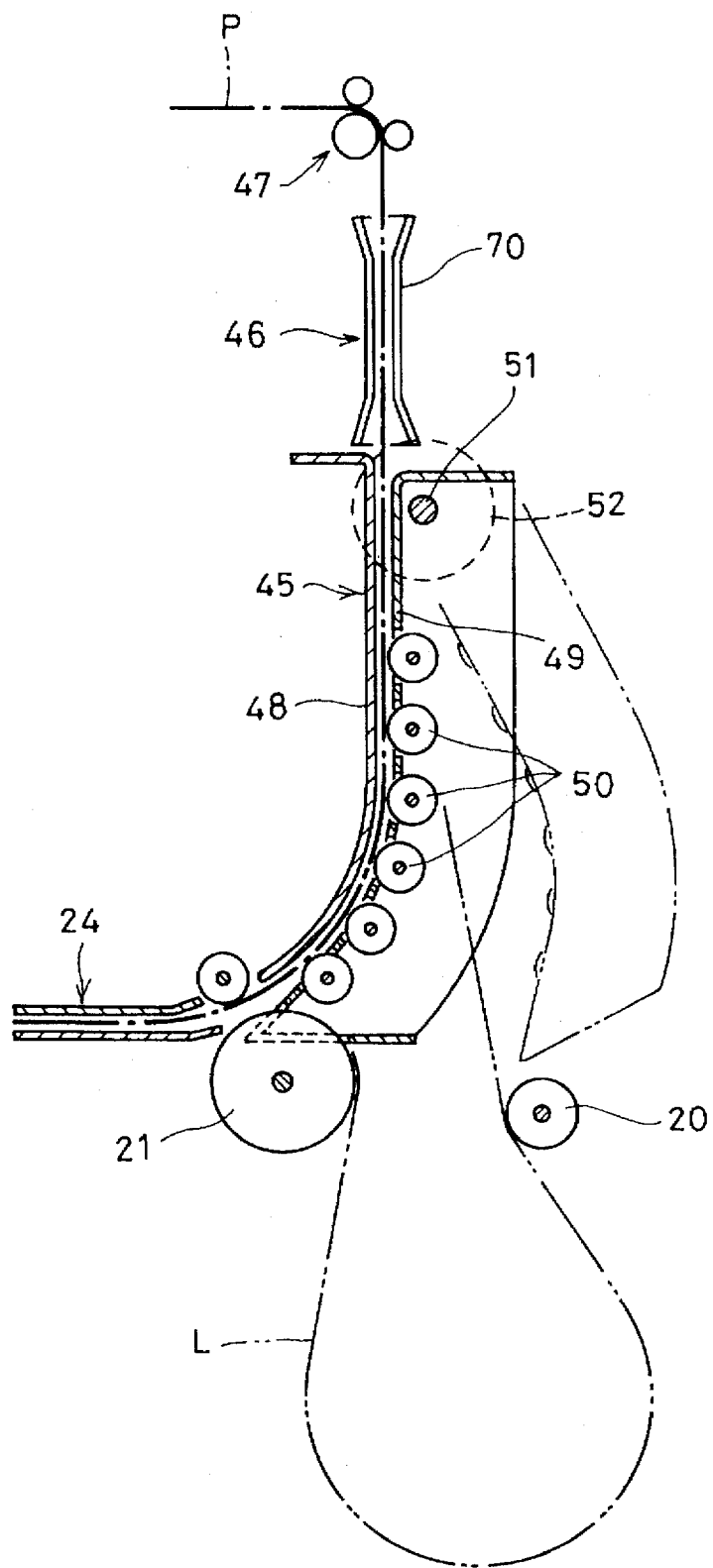
FIG. 6 is an enlarged sectional view of a third paper guide.

FIG. 6 shows the detailed structure of the third paper guide 45. It comprises a pair of guide plates 48 and 49 arranged opposite to each other. Their lower ends are arcuate.

Of the two guide plates 48, 49, the guide plate 49, which is positioned opposite to the emulsion-coated surface of the sensitive material P, rotatably carries a plurality of rollers 50 for guiding the sensitive material P. A rotary shaft 51 is fixed to the top end of the guide plate 49. By driving a motor 52 connected to one end of the rotary shaft 51, the guide plate 49 is pivoted.

The guide plates 48, 49 are preferably formed from the plate members 42 shown in FIG. 10.

By setting the paper magazine 3 on the magazine support table 2 and inserting the leading end of the sensitive material P protruding from the paper magazine 3 into between the feed rollers 22, the sensitive material P is fed thereby.

The sensitive material P is fed while being guided by the first paper guide 23, second paper guide 24, and further by the third paper guide 45, with its longitudinal edges being guided by the width restriction guides 46, and is inserted into between the feed rollers 47.

By turning the feed rollers 47 in this state, the sensitive material P is fed onto the exposure table 18.

The feed rollers 47 are deactivated when the leading end of the sensitive material P arrives on the exposure table 18. The motor 52 is then activated to open the guide plate 49 of the third paper guide 45, so that the sensitive material P, being fed by the feed rollers 22, forms a loop L between the guide rollers 20 and 21. (FIG. 1)

By turning the feed rollers 47, the portion of the sensitive material P located downstream of the guide rollers 20, 21 is fed onto the exposure table 18 and printed. Thus, the size of the loop L decreases gradually. When its size decreases to a certain point, the sensitive material P is fed by turning the feed rollers 22 until the loop L grows to a predetermined size.

While printing, both longitudinal edges of the sensitive material P are guided by the width restriction guides 4 in the paper magazine 3 and the width restriction guides 46 immediately upstream of the exposure table 18. Thus, the sensitive material P can be fed accurately without meandering.

If the sensitive material is jammed immediately after the sensitive material P is inserted into the feed path, the jammed portion of the sensitive material P can be removed e.g. by tearing it after opening an unillustrated cover of the outer case 1, opening the lower guide plate 26 of the first paper guide 23, pulling the jammed portion of the sensitive material P under the first paper guide through thus formed opening, and removing it e.g. by tearing.

After removing the jammed portion of the sensitive material P, the lower guide plate 26 is turned back to its closed position so as to feed the sensitive material P again.

Since any jammed portion of the sensitive material P can be removed simply by opening the lower guide plate 26, jamming can be eliminated easily.

Figure 7:
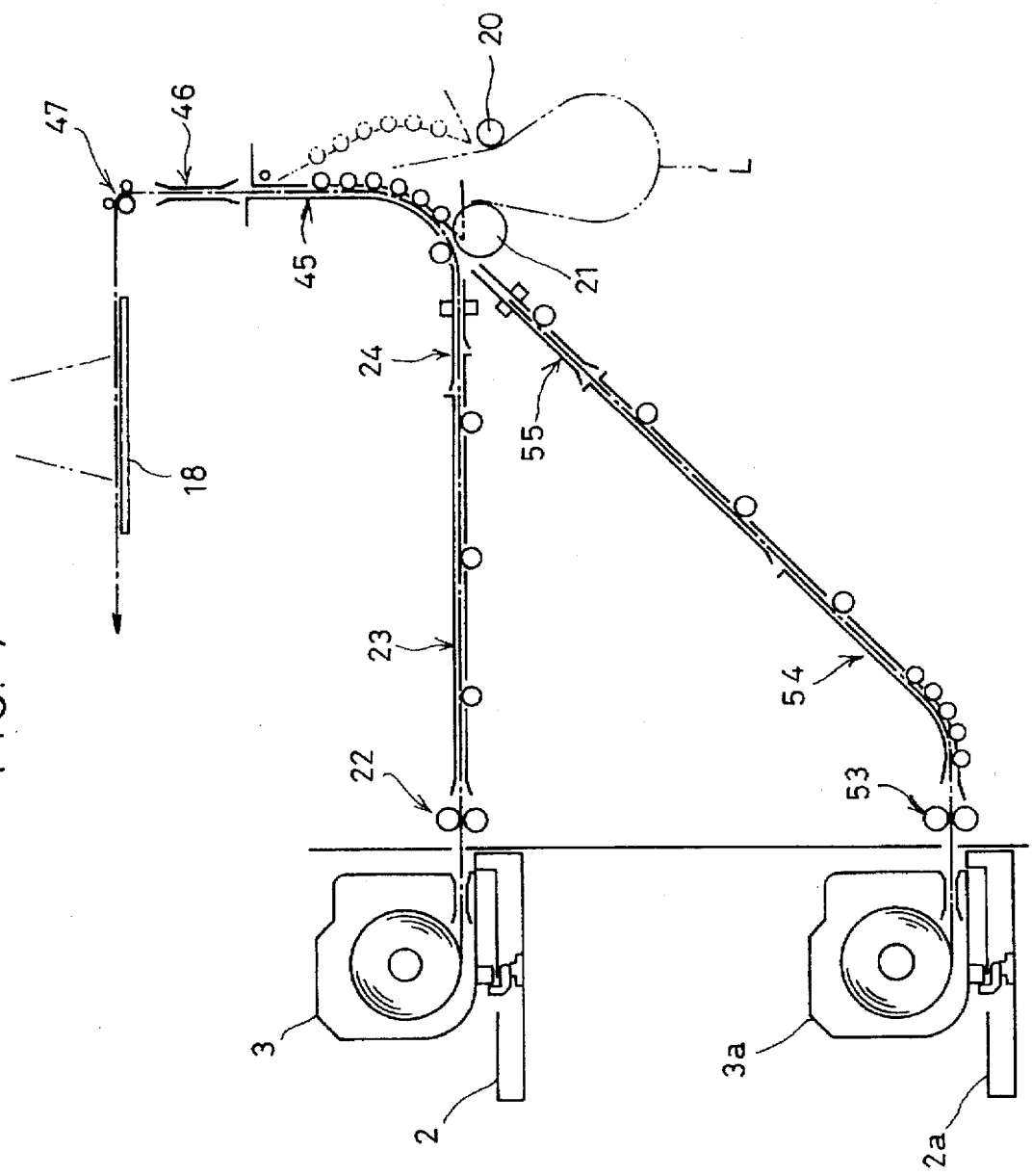
FIG. 7 is a schematic view of another embodiment of the photoprinting machine.

FIG. 7 shows another embodiment of the photoprinting machine. In this embodiment, an extra magazine support 2a is provided under the magazine support 2 of the photoprinting machine of FIG. 1. It carries a second paper magazine 3a.

The lower magazine support table 2a and the paper magazine 3a supported thereon are of the same structure as those shown in FIGS. 2 and 3, and therefore description thereof will be omitted.

Provided along the feed path through which the sensitive material P rolled out of the lower paper magazine 3a is fed toward the guide roller 21 are, from upstream to downstream, feed rollers 53, a fourth paper guide 54, and a fifth paper guide 55.

Figure 8:
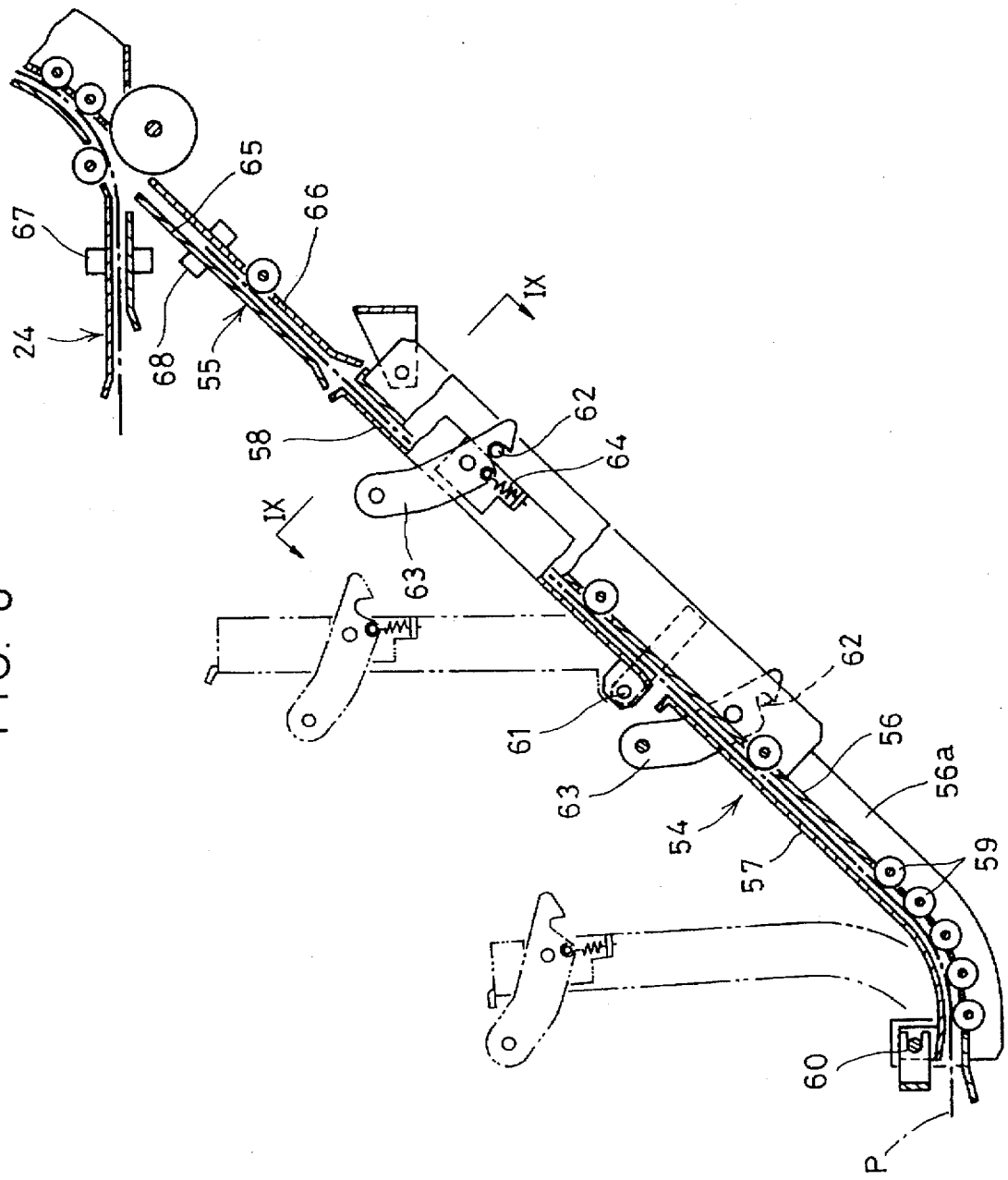
FIG. 8 is an enlarged sectional view of a fourth paper guide.
Figure 9:
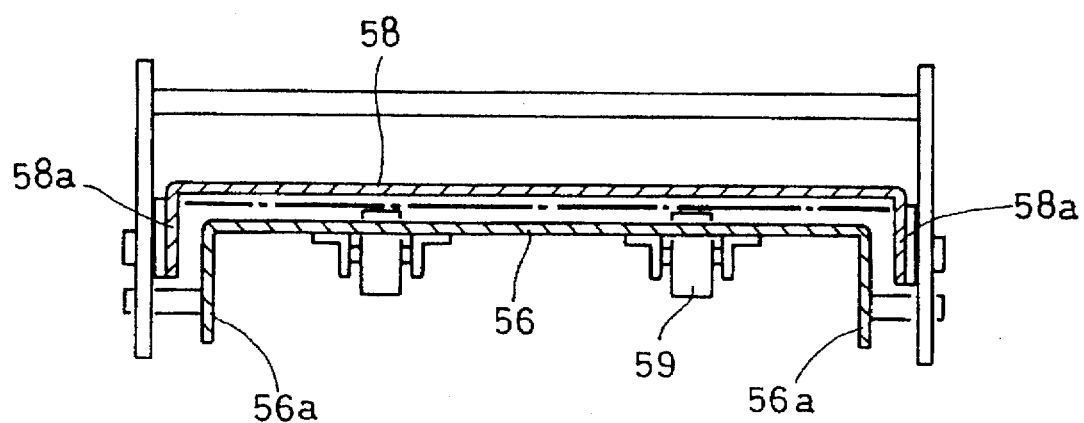
FIG. 9 is a sectional view taken along line IX—IX of FIG. 8.

FIGS. 8 and 9 show the details of the fourth paper guide 54. It comprises a lower guide plate 56, and first and second upper guide plates 57 and 58 that are provided over the lower guide plate 56 with a gap formed therebetween through which sensitive materials P can pass. The lower guide plate 56 and the first upper guide plate 57 have arcuate rear ends.

A pair of side plates 56a are provided on both sides of the lower guide plate 56. The plate 56 also carries a plurality of rotatable rollers 59 for guiding the emulsion-coated side of the sensitive material P. The lower guide plate 56 is immovable.

The first upper guide plate 57 and the second upper guide plate 58 have on both sides thereof a pair of side plates 58a for preventing meandering of the sensitive material P. The guide plates 57 and 58 have their rear ends, with respect to the feed direction of the sensitive material P, supported on the shafts 60 and 61, respectively, so as to pivot between open and closed positions.

The side plates of the first and second upper guide plates 57 and 58 are provided at their respective front ends with hooks 63 adapted to engage pins 62 mounted on the side plates 56a of the lower guide plate 56. By engaging the hooks 63 with the pins 62, the first upper guide plate 57 and the second upper guide plate 58 are kept in the closed positions. In the closed position, the hooks 63 engage pins 62, biased by springs 64.

Since the first upper guide plate 57 and the second upper guide plate 58 are pivotable between open and closed positions, any portion of the sensitive material P that may be jammed while being fed can be removed easily from the feed path by opening the guide plate 57 or 58.

The fifth paper guide 55 comprises, similar to the second paper guide 24, two fixed guide plates 65 and 66 that are provided opposite to and spaced from each other so that the sensitive material P can be fed therebetween.

The second paper guide 24 and the fifth paper guide 55 carry sensors 67 and 68, respectively, for detecting the passage of the leading ends of sensitive materials P. While the sensitive material P stored in the upper paper magazine is being fed, the sensitive material P in the lower paper magazine 3a is held in the position where its leading end is disposed at the sensor 68. With this arrangement, it is possible to quickly change over the material P to be fed from one to the other.

In the illustrated embodiments, the paper magazines 3, 3a are mounted on the outside of the outer case 1. But they may be mounted inside the outer case 1.

The guide device according to this invention includes a paper guide for guiding photosensitive material. It is made up of two guide plates provided opposite to and spaced from each other so that a photosensitive material can pass therebetween. One of the guide plates is immovable, while the other is movable between open and closed positions. If the photosensitive material being fed through the feed path is jammed between the guide plates, the jammed portion can be removed easily by opening the movable guide plate.

One of the guide plates that faces an emulsion-coated side of the photosensitive material carries rotatable rollers adapted to rotate by being brought into contact with the photosensitive material. These rollers guide the sensitive material smoothly, thereby protecting its emulsion-coated surface against any damage.

The pair of side plates provided on both sides of one of the guide plates prevent extreme meandering of sensitive materials and also serves to reliably guide the leading end of each photosensitive material between the guide plates.

What is claimed is:

1. A guide device for use in a photoprinting machine including a paper magazine for housing a roll of photosenitive material, an exposure unit, and a feed path along which the photosensitive material is fed from the paper magazine to the exposure unit, said guide device including a paper guide to be provided along the feed path for guiding the photosensitive material, said paper guide comprising:

a pair of guide plates having confronting surfaces spaced from each other to enable passage therebetween of the photosensitive material, each said confronting surface having distributed uniformly over the entire area thereof a plurality of round protrusions;

a first said guide plate being fixed, and a second said guide plate being supported for movement relative to said first guide plate between an open position and a closed position; and said first and second guide plates having locking devices to lock said second guide plate in said closed position.

2. A guide device as claimed in claim 1, wherein one of said guide plates to face an emulsion-coated side of the photosensitive material has mounted thereon a plurality of rollers operable to rotate by contact with the photosensitive material.

3. A guide device as claimed in claim 1, wherein one of said guide plates has at opposite sides thereof said plates that extend transverse to said surface of said one guide plate and in longitudinal direction thereto relative to the feed path.

4. A guide device for use in a photoprinting machine including a paper magazine for housing a roll of photosensitive material, an exposure unit, and a feed path along which the photosensitive material is fed from the paper magazine to the exposure unit, said guide device including a paper guide to be provided along the feed path for guiding the photosensitive material, said paper guide comprising:

a pair of guide plates spaced from each other to enable passage therebetween of the photosensitive material;

a first said guide plate being fixed, and a second said guide plate being supported for movement relative to said first guide plate between an open position and a closed position; and one of said guide plates to face an emulsion-coated side of the photosensitive material having mounted thereon a plurality of rollers operable to rotate by contact with the photosensitive material.

5. A guide device as claimed in claim 4, wherein one of said guide plates has at opposite sides thereof side plates that extend transverse to said guide plate and in a longitudinal direction thereof relative to the feed path.

* * * * *